(12) United States Patent
Beaver et al.

(10) Patent No.: US 9,323,860 B2
(45) Date of Patent: Apr. 26, 2016

(54) ENHANCING CLIENT-SIDE OBJECT CACHING FOR WEB BASED APPLICATIONS

(75) Inventors: Michael B. Beaver, Raleigh, NC (US);
Jason A. Collier, Raleigh, NC (US);
Jeffrey S. Jagoda, Raleigh, NC (US);
Marlies Santos Deas, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1139 days.

(21) Appl. No.: 12/940,294

(22) Filed: Nov. 5, 2010

(65) Prior Publication Data

US 2012/0117141 A1 May 10, 2012

(51) Int. Cl.
*G06F 15/16* (2006.01)
*G06F 17/30* (2006.01)
*H04L 29/08* (2006.01)

(52) U.S. Cl.
CPC .... *G06F 17/30902* (2013.01); *H04L 29/08072* (2013.01)

(58) Field of Classification Search
CPC .............. G06F 17/30902; H04L 29/08072
USPC .................................................. 709/203, 201
See application file for complete search history.

(56) References Cited

U.S. PATENT DOCUMENTS

| 6,199,107 | B1 * | 3/2001 | Dujari | G06F 17/30902 |
| | | | | 707/E17.12 |
| 2002/0049788 | A1 * | 4/2002 | Lipkin | G06F 17/30893 |
| | | | | 715/236 |
| 2006/0047780 | A1 * | 3/2006 | Patnude | H04L 67/02 |
| | | | | 709/219 |
| 2008/0028086 | A1 | 1/2008 | Chetuparambil et al. | |
| 2008/0271127 | A1 * | 10/2008 | Naibo | G06F 21/51 |
| | | | | 726/6 |
| 2009/0271474 | A1 * | 10/2009 | Fu | G06Q 10/10 |
| | | | | 709/202 |

OTHER PUBLICATIONS

Ramaswamy, L., et al., "Automatic Detection of Fragments in Dynamically Generated Web Pages," Proc. of the 13th Int'l. Conf. on World Wide Web, pp. 443-454, 2004.
Shi, W., et al., "Modeling object characteristics of dynamic Web content," Journal of Parallel and Distributed Computing, vol. 63, No. 10, pp. 963-980, 2003.

(Continued)

*Primary Examiner* — Dustin Nguyen
*Assistant Examiner* — Joel Mesa
(74) *Attorney, Agent, or Firm* — Patents on Demand P.A.; Brian K. Buchheit; Scott M. Garrett

(57) ABSTRACT

An object request associated with a requesting entity can be identified. The object request can comprise of an object identifier and an object type associated with an object instance which can be a renderable entity. The entity can be a widget within an application executing within a client device. An object type associated with the object request can be determined which can be decomposed into an attribute request based a selected schema. The attribute request can comprise of an object instance identifier and an attribute identifier associated with an attribute value. An attribute index associated with a client-side object cache can be queried for the attribute value. When the attribute value exists in the attribute index, an appropriate attribute value associated with the attribute can be conveyed to the entity. When the attribute value is absent from the attribute index, the attribute request can be conveyed to a request aggregator.

20 Claims, 3 Drawing Sheets

(56) References Cited

OTHER PUBLICATIONS

Zyp, C., "A Standards Based Approach to Comet Communication with REST," CometDaily, Dec. 27, 2007, Retrieved from <http://cometdaily.com/2007/12/27/a-standards-based-approach-to-comet-communication-with-rest/>.

Zyp, K., "A JSON Media Type for Describing the Structure and Meaning of JSON Documents," Internet Engineering Task Force, Dec. 5, 2009.

* cited by examiner

```
{
    {
        "type": "resource",
        "name": "Article",
        "attributes": {
            "id": { "type": "string" },
            "title": { "type": "string" },
            "author": { "type": "string" },
            "lastModified": { "type": "date" },
            "body": { "type": "string" }
        },
        "mapping": "/webapp/ObjectServices/${name}/${instance}/${attribute}"
    },
    {
        "type": "subtype",
        "name": "ArticleMeta",
        "from": "Article",
        "attributes": [ "id", "author", "lastModified" ]
    },
    {
        "type": "subtype",
        "name": "ArticleText",
        "from": "Article",
        "attributes": [ "title", "author", "body" ]
    }
}
```

- 300 (overall)
- 310 (outer block)
- 320 (resource block)
- 330 (mapping line)
- 340 (ArticleMeta subtype block)

FIG. 3

ENHANCING CLIENT-SIDE OBJECT CACHING FOR WEB BASED APPLICATIONS

BACKGROUND

The disclosure relates to the field of Web-based applications and, more particularly, to enhancing client-side object caching for Web-based applications.

Web 2.0 applications have become increasingly modular in both core application and user interface design. Many times, a single application interface is composed of several independent sub-components referred to as "widgets". Widgets typically utilize objects (e.g., JAVASCRIPT object) to perform operations and execute functionality. Many times widgets utilize objects and object data to present information within an interface. For example, a stock ticker widget can utilize stock market data within an object to present trending information for one or more stocks. Due to the dynamic nature of most widgets, caching of appropriate objects can be indeterminable. For instance, user interactions with widgets dictate what information and consequently which objects the widgets require.

In very rich/dynamic interfaces these objects often include common data (e.g., object attributes) which can be used by several widgets. Since the widgets typically are isolated from other widgets to maintain modularity and flexibility, this often results in redundant requests and/or transmission of this common data. That is, widgets often request the same common data (e.g., objects) frequently that other widgets previously requested. Consequently, network and server resources can be unduly taxed from this superfluous communication.

Current approaches to this problem include traditional browser caches which cache objects on the client-side. However, traditional cache systems do not provide a means for sharing this common data. As such, there is no mechanism to determine which common data can be shared. Further, traditional caches cannot progressively reduce requests to server resources as they do not enable reconstruction of server-side data models.

SUMMARY

An object request associated with a requesting entity can be identified. The object request can comprise of an object identifier and an object type associated with an object instance which can be a renderable entity. The entity can be a widget within an application executing within a client device. An object type associated with the object request can be determined which can be decomposed into an attribute request based a selected schema. The attribute request can comprise of an object instance identifier and an attribute identifier associated with an attribute value. An attribute index associated with a client-side object cache can be queried for the attribute value. When the attribute value exists in the attribute index, an appropriate attribute value associated with the attribute can be conveyed to the entity. When the attribute value is absent from the attribute index, the attribute request can be conveyed to a request aggregator.

BRIEF DESCRIPTION OF THE SEVERAL VIEWS OF THE DRAWINGS

FIG. 3 is a schematic diagram illustrating a sample schema for enhancing client-side object caching for Web-based applications in accordance with an embodiment of the inventive arrangements disclosed herein.

DETAILED DESCRIPTION

Figure 1:
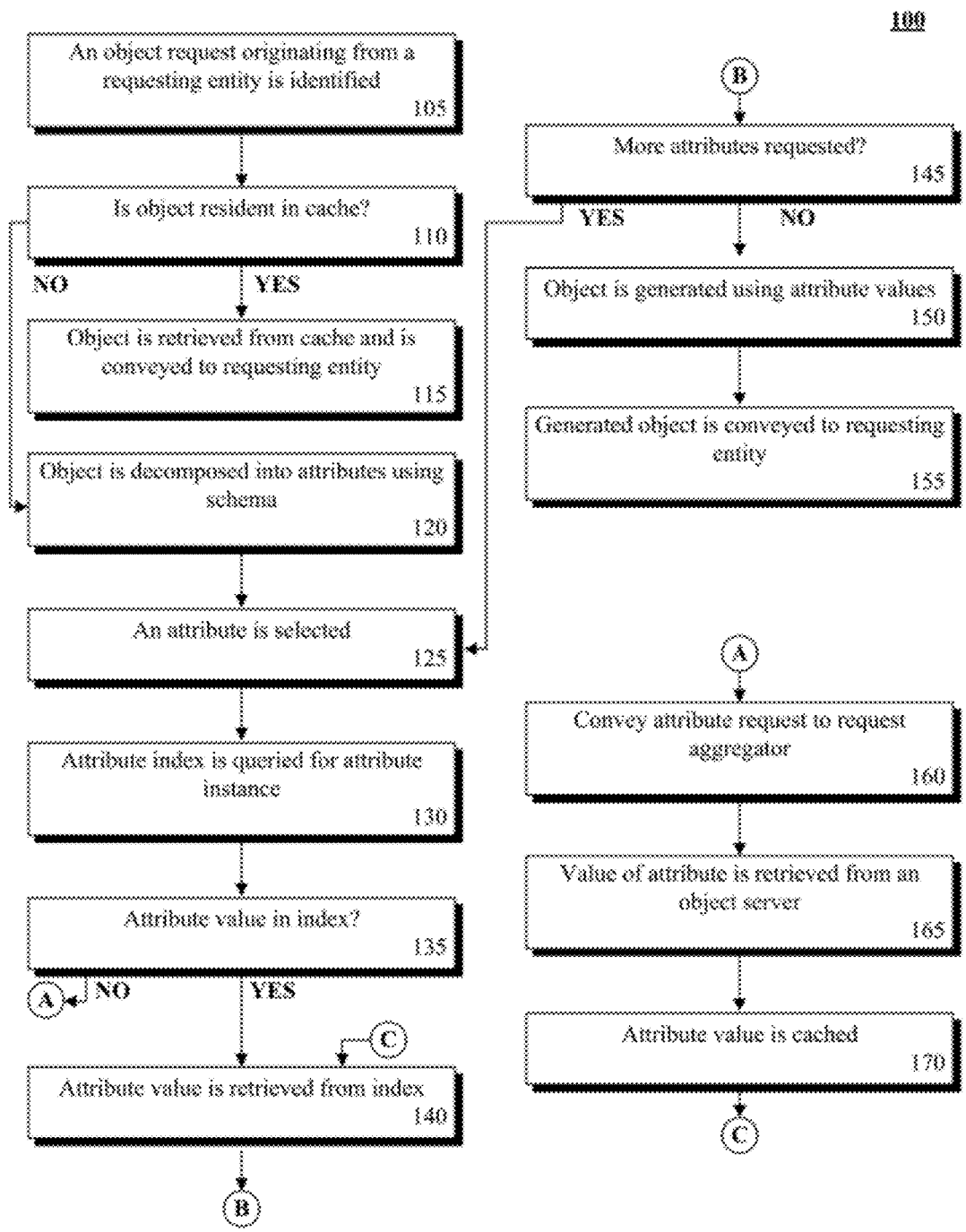
FIG. 1 is a schematic diagram illustrating a method for enhancing client-side object caching for Web-based applications in accordance with an embodiment of the inventive arrangements disclosed herein.

The present disclosure is a solution for enhancing client-side object caching for Web-based applications. In the solution, a client computing device can utilize a caching agent to permit attribute level object metadata sharing of renderable objects between applications. The caching agent can be a client-side object cache which can intercept object requests, process, and respond with an appropriate object instance. The caching agent can utilize an object schema to allow an object type associated with the object request to be decomposed into constituent attributes. Each attribute can be queried from an attribute index associated with the object cache. Attributes which are stored within the index can be retrieved and utilized to build the object instance associated with the object request. When an attribute is not cached within the index, server communication can be initiated to obtain relevant attributes.

As will be appreciated by one skilled in the art, the disclosure may be embodied as a system, method or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the disclosure may take the form of a computer program product embodied in one or more computer readable medium(s) having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for enhancing client-side object caching for Web-based applications in accordance with an embodiment of the inventive arrangements disclosed herein. In method 100, a client device executing Web-based applications can utilize a caching agent to permit decreased server dependence for interface renderable objects. The caching agent can be a client-side object cache able to incrementally reconstruct a server-side object model in response to each object request from the client device. That is, the caching agent can progressively provide applications associated with the client device with necessary interface objects from within the client-side object cache without requiring superfluous server interactions (e.g., server object requests). In one instance, caching agent can be a caching proxy able to intercept and fulfill object requests from client device. It should be appreciated that the disclosure provides benefits to many service oriented architectures (SOA) where extensive client-server communication can be required.

As used herein, an object request can comprise of an object instance identifier and object type which can be used to query the caching agent for a specific object instance. The method 100 can utilize a schema to decompose object requests into constituent attributes based on the provided object type. Attribute values stored within the client-side object cache can be retrieved and an object instance can be composed utilizing attribute values. The composed object instance can be conveyed to the client device. It should be noted attribute values are instance values associated with an object instance. For the purposes of clarity, object instance and attribute value can be referred to as object and attribute henceforth.

In one instance, the Web application can be an Asynchronous Javascript and Extensible Markup Language (AJAX) enabled application (e.g., portal) which can communicate heavily with a server-side resource (e.g., object server). In the instance, the caching agent can permit object requests to be serviced by dynamically building the object being requested using cached attribute values.

In step 105, an object request originating from a requesting entity can be identified. For example the requesting entity can be a widget component of a Web application. In step 110, if the object instance is resident in cache, the method can proceed to step 115, else continue to step 120. In step 115, the object can be retrieved from cache and conveyed to the requesting entity.

In step 120, the object type being requested can be decomposed into attributes utilizing a schema. That is, the request information can be used to identify the object type which permits disassembly into one or more attribute requests using an object model schema. For example, the object request can be associated with a JAVASCRIPT OBJECT which can be decomposed into attributes using a JAVASCRIPT OBJECT NOTATION schema. In step 125, an attribute is selected. Selection can be ordered or arbitrary depending on configuration parameters, resource availability, and the like. In one instance, selection can be performed alphabetically based on attribute names. In another instance, selection can be performed based on attribute occurrence within the schema (e.g., first in first out).

In step 130, an attribute index associated with the client-side object cache can be queried for the attribute values. In one instance, the attribute index can be a hash table comprising attribute information, including, but not limited to, resource identifier (e.g., application identifier) attribute identifier (e.g., attribute name), attribute value (e.g., alphanumeric value), and the like. In step 135, if the attribute instance exists within the index, the method can continue to step 140, else proceed to step 160. In step 140, the attribute value can be retrieved from the index.

In step 145, if more attributes are requested, the method can return to step 125, else continue to step 150. In step 150, the object can be generated using attribute values retrieved from the index. It should be appreciated that the schema utilized in step 120 can be reused to combine the component attribute values into an appropriate object instance. In step 155, the generated object can be conveyed to the requesting entity.

In step 160, an attribute request can be conveyed to a request aggregator. The attribute request can be generated by caching agent in response to attribute absence within the index. The request aggregator can convey one or more attribute request to an object server. In step 165, the value of the attribute instance can be retrieved from the object server via one or more traditional communication mechanisms (e.g., Hypertext Transport Protocol request). In step 170, the attribute value can be cached with the appropriate identifier (e.g., application resource identifier). The method can return to step 140, where the method can continue to execute until object requests are ceased.

Drawings presented herein are for illustrative purposes only and should not be construed to limit the invention in any regard. Steps 125-145 can be executed for each attribute comprising the object requested. When an attribute is not resident within the attribute index, steps 160-170 can be executed until all attribute are obtained. It should be appreciated steps 105-155 and steps 160-170 can be executed simultaneously and/or in parallel.

Figure 2:
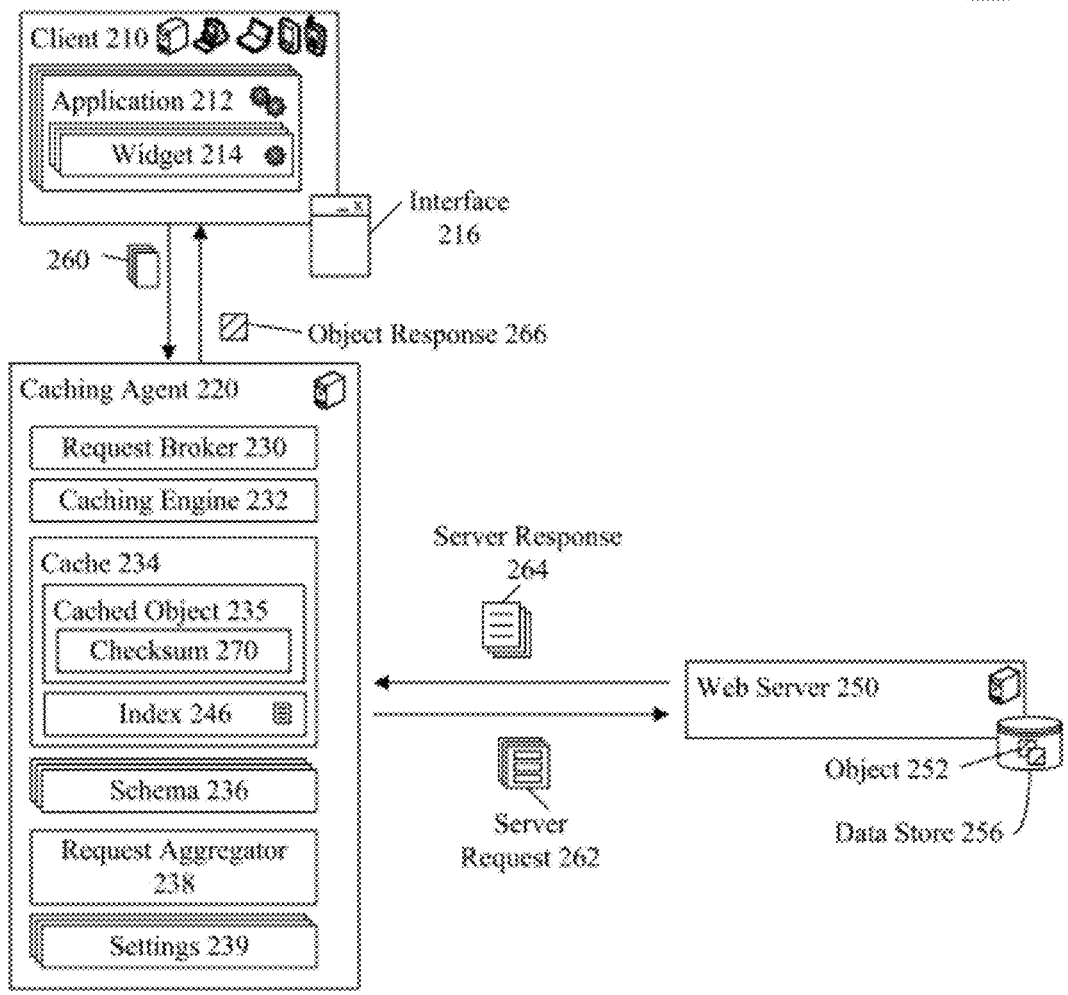
FIG. 2 is a schematic diagram illustrating a system for enhancing client-side object caching for Web-based applications in accordance with an embodiment of the inventive arrangements disclosed herein.

FIG. 2 is a schematic diagram illustrating a system 200 for enhancing client-side object caching for Web-based applications in accordance with an embodiment of the inventive arrangements disclosed herein. System 200 can be present in the context of method 100. In system 200, a caching agent 220 can service object requests (e.g., request 260) from application 212 associated with client 210 via an attribute level caching mechanism (e.g., index 246). For example, an article document, represented as an object comprised of document metadata (e.g., author, article body) can be generated in real-time utilizing cached object attributes which can be conveyed to an article viewer (e.g., widget 214) and presented within interface 216. It should be noted that attribute values can be cached independently of object identifier and object name.

In one embodiment, caching agent 220 can function as a transparent caching proxy able to dynamically provide object 252 (e.g., as cached object 235) data for client 210. That is, caching agent 220 can act as an intermediary for Web server 250 enabling server resources to be freed. It should be appreciated that client 210, application 212, widget 214 configuration can remain unchanged to enable the functionally described herein to be achieved.

As used herein, object 235, 252 can represent an instance of an object type within system 200 containing instance values. Object 235, 252 can comprise of attributes which can be one or more data structures. Object 235, 252 can include data structures associated with one or more computer programming languages including, but not limited to, JAVASCRIPT, JAVA 2 ENTERPRISE EDITION (J2EE), and the like. Data structures can include, but is not limited to, arrays, associative arrays, booleans, strings, integers, and the like. Object 235, 252 can be associated with a schema 236 which can describe the structure of the object 235, 252. In one instance, object 235, 252 can be user interface elements which can be rendered within an interface (e.g., interface 216).

Communication 260-266 between system 200 components can conform to a Representational State Transfer (REST) architecture, Simple Object Access Protocol (SOAP) framework, and the like. Communication 260-266 can be synchronous and/or asynchronous contingent on application 212, widget 214, and/or system 200 architecture. Communication 260-266 between system 200 components can include, but is not limited to Hypertext Transport Protocol (HTTP), HTTP Secure (HTTPS), and the like. System 200 components can be communicatively linked via one or more networks including, but not limited to, public networks, private networks, virtual private networks, and the like.

Request 260 can be a communication message associated with application 212 and/or widget 214 identifying an object instance and object type to be retrieved. Request 260 can identify resources (e.g., object instance) via one or more traditional mechanisms including, but not limited to, Uniform Resource Identifier (URI), Uniform Resource Locator (URL), and the like. Request 260 can comprise of HTTP methods including, but is not limited to GET, POST, PUT, and the like. In one instance, request 260 message body can contain object type information, application identification information, instance identifiers, and the like. In one instance, request 260 can include, but is not limited to, an XMLHTTPRequest (XHR), HTTP request, and the like. In the instance, request 260 can be an AJAX method which can be intercepted by caching agent 220. In one embodiment, request 260 can comprise of multiple object instances and/or object types to be retrieved. In the embodiment, the multiple objects can be iteratively retrieved from the cache via traditional object caching mechanisms and/or disclosure specific caching functionality Caching agent 220 can be a client-side hardware/software entity able to dynamically generate cached object 235 from attribute values within index 246. Agent 220 can comprise, but is not limited to, request broker 230, caching engine 232, cache 234, schema 236, request aggregator 238, and the like. In one instance, agent 220 can be a component of client 210, interface 216, an application, and the like. In the instance, agent 220 can be a component of an API enabling widget 214 to communicate with agent 220 in real-time to obtain generated object instance data. In one embodiment, caching agent 220 can be a component of an IBM WEBSPHERE middleware.

Request broker 230 can be a hardware/software component able to process object request 260. Broker 230 can receive request 260 which can be decomposed into an appropriate collection of attributes utilizing object type information from request 260 and schema 236. Broker 230 can iteratively query cache 234 via communication with caching engine 232 for each attribute in the collection. In one embodiment, when an attribute value is not returned from the cache 234 (e.g., attribute does not exist in the cache), broker 230 can forward an attribute request to request aggregator 238. In the embodiment, mapping information (e.g., mapping 330) associated with schema 236 can be utilized to generate a server request 262. Upon acquisition of necessary attributes, broker 230 can reconstruct the required object which can be conveyed as object response 266. In instances where the object 235 already is constructed and cached object 235, broker 230 can convey the cached object 235 instance to application 212 immediately.

Caching engine 232 can be a hardware/software component configured to manage cache 234 and/or cached object 235. Engine 232 can respond to request broker 230 communication and can retrieve cached object 235 and/or attribute values within index 246. Engine 232 can utilize traditional and/or proprietary caching mechanisms including, but not limited to, distributed caching, peer-to-peer caching, and the like. Engine 232 can utilize any number of traditional and/or proprietary cache expiration algorithms including, but not limited to, least frequently used (LFU), least recently used (LRU), most recently used (MRU), first in first out (FIFO), last access time, object size, and the like. Caching engine 232 can be used to determine valid objects and/or attributes within cache and/or index 246. It should be noted that attribute level tracking can be disfavored due to excessive resource consumption but object tracking can be preferred to enable system 200 functionality to be achieved.

In one instance, a checksum 270 associated with the cache object 235 can be computed to determine the object usability. Checksum 270 can be computed by any component within caching agent 220 including, but not limited to, cache 234, caching engine 232, and the like. Checksum 270 can be include, but is not limited to, a hash value, an HTTP ETAG (entity tag), and the like. In scenarios where nested objects exist within an object, a checksum can be computed using checksums of the nested objects. For example, a checksum for an object instance (e.g., object type 320) can be computed using a checksum for a nested object instance (e.g., object type 340).

In one embodiment, a checksum 270 can be computed to track object 235, 252 changes. In the embodiment, the checksum 270 can be compared against a server computed checksum associated with object 252 to determine object modification occurrence. In one configuration of the embodiment, when the object checksum 270 and server checksum for object 252 are not identical, the attribute values within index 246 can be invalidated and the relevant attribute requests can be conveyed to request aggregator.

Schema 236 can be an entity describing the semantic and/or structure of objects within system 200. Schema 236 can include but is not limited to, JAVASCRIPT OBJECT NOTATION (JSON), Extensible Markup Language (XML) schema, and the like. Schema 236 can be automatically and/or manually generated based on the configuration of client 210, agent 220, and/or system 20 components. Schema 236 can specify mapping information for conveying attribute requests to aggregator 238. For example, mapping 330 can be used to create an attribute request (e.g., GET/webapp/ObjectService/Article/json.txt/title HTTP/1.1) for an article object instance named json.txt.

Request aggregator 238 can be a hardware/software component for receiving and processing attribute requests (e.g., requests from broker 230). Aggregator 238 can convey attribute requests to server 250 as server request 262 which can be processed by server 250. In one embodiment, aggregator can operate using a sliding window mechanism which can be configurable using settings 239. In the embodiment, aggregator 239 can package multiple attribute requests into a single server request based on the number of attribute requests, a time duration, and the like.

Settings 239 can be one or more rules for establishing caching agent 220 behavior and/or functionality. Settings 239 can enable flexible and robust configuration of caching agent 220. Settings 239 can permit cache 234 to persist object 235 across instance sessions. For example, when a widget 214 is terminated, object 235 can remain within cache for use by other widgets executing within application 212. Further, settings 239 can be utilized to establish coherency policies when cache 234 is a component of a distributed cache.

Index 246 can be an organizational data structure permitting identification and retrieval of attribute values (e.g., entry 242) associated with an object (e.g., object instance). In one instance, index 246 can be associated with a database which can include, but is not limited to, a Relational Database Management System (RDMBS), an Object Oriented Database Management System (OODBMS), and the like. For example, index 246 can be a database table stored within a database. It should be appreciated that index 246 can be stored within cache 234, network attached storage, storage area network, and the like. In one instance, index 246 can be annexed to a standard object cache permitting enhancement of an existing object cache while minimizing caching framework changes.

Client 210 can be a hardware/software entity able to execute application instance 212. Client 210 can comprise of, but is not limited to, application instance 212, interface 216, and the like. Client 210 can include, but is not limited to, a desktop computer, a laptop, a netbook, a mobile phone, a portable computing device, a portable media player, a portable digital assistant, a tablet, and the like.

Application 212 can be a software entity comprising component widget 214 which can manage widget 214. Application 212 can include, but is not limited to, a Web page application, a Web-service, a portal application, a desktop application, and the like. For example, application 212 can be a rich internet application enabling document editing and management (e.g., office suite). In one instance, application 212 can be a widget toolkit, widget framework, and the like. In the instance, application 212 can be component of an application programming interface (API) for communicating with Web server 250.

Widget 214 can be one or more executable components of an application 212. Widget 214 can comprise one or more scripting languages including, but not limited to, Dynamic Hypertext Markup Language (DHTML), JAVASCRIPT, ACTIONSCRIPT, and the like. For example, widget 214 can be a DHTML widget for presenting flight arrival information. In one instance, widget 214 can be a JAVA 2 ENTERPRISE EDITION (J2EE) applet, JAVA 2 MOBILE EDITION (J2ME) applet, and the like. In another instance, widget 214 can be a user interface element able to be rendered within an interface 216.

Interface 216 can be a user interface able to present widget 214. Interface 216 can include, but is not limited to, a Web browser, an application interface, an operating system interface, and the like. In one instance, interface 216 can a renderable canvas associated with application 212 and/or widget 214.

Cache 234 can be a hardware/software component for temporarily storing cached object 234. Cache 234 can comprise of, but is not limited to, cached object 235, one or more client-side objects, and the like. Cache 234 can include, but is not limited to, non-volatile memory, volatile memory, and the like. Cache 234 can be a traditional and/or proprietary caching mechanism which can be configured through settings 239.

Drawings presented herein are for illustrative purposes only and should not be construed to limit the invention in any regard. In one instance, application 212 can be a widget comprising sub-component widgets 214. It should be appreciated, request aggregator 238 can be a stand-alone component, network component, distributed computing element, and the like. Agent 220 can be a network element, distributed computing element, cloud-based network element, and the like. It should be noted, schema 236 can be stored within a computing element associated with system 200 which can include, but is not limited to, client 210, agent 220, data store 256, network attached storage, and the like.

The flowchart and block diagrams in the FIGS. 1-3 illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for enhancing client-side object caching, the computer program product comprising a non-transitory computer readable storage medium having computer usable program code embodied therewith, the computer usable program code comprising:

computer usable program code stored on a non-transitory storage medium that when executed by a processor is operable to identify an object request associated with a requesting entity, wherein the object request comprises of an object identifier and an object type associated with an object instance, wherein the requesting entity is a widget within an application executing within a client-side computing device, and wherein the object instance is a renderable entity of the widget;

computer usable program code stored on a non-transitory storage medium that when executed by a processor is operable to decompose the object request into a plurality of different attribute requests, wherein each of the different attribute requests is a request for at least one attribute value;

computer usable program code stored on a non-transitory storage medium that when executed by a processor is operable to, for each of the different attribute requests, query an attribute index of an object cache for the at least one attribute value;

computer usable program code stored on a non-transitory storage medium that when executed by a processor is operable to, when the attribute value exists in the attribute index that is associated with an object associated with other widget, convey an appropriate attribute value for the corresponding attribute request to the requesting entity from the object cache; and computer usable program code stored on a non-transitory storage medium that when executed by a processor is operable to, when the attribute value is absent from the attribute index, convey the attribute request to a server remotely located from the object cache;

computer usable program code stored on a non-transitory storage medium that when executed by a processor is operable to receive a server-provided attribute value from the server for the corresponding attribute request;

computer usable program code stored on a non-transitory storage medium that when executed by a processor is operable to cache the server-provided attribute value in the object cache; and computer usable program code stored on a non-transitory storage medium that when executed by a processor is operable to convey the server-provided attribute value to the requesting entity.

2. A system for enhancing client-side object caching comprising: a request broker, including a processor, capable of receiving an object instance request comprising object instance request information, wherein the object instance request information is an object instance identifier and an object type, wherein the object instance identifier is associated with an object instance; a caching engine, including a processor, able to retrieve at least one attribute value associated with the object instance request information; a schema, embedded in non-transitory computer readable memory, able to map an object type associated with an object instance to at least one attribute value, wherein the object instance is associated with the object instance request; and a cache configured to store an object instance and an attribute index, wherein the attribute index comprises of at least an instance identifier, an attribute instance identifier, and an attribute instance value, wherein the caching engine determines at least one of objects and attributes, within at least one of cache and index that are usable by other widgets.

3. The system of claim 2, wherein the object instance comprises of at least one subordinate object instance, wherein the object instance is associated with a checksum, wherein the checksum is calculated using the checksum of the at least one subordinate object instance.

4. The system of claim 2, wherein the checksum is an HYPERTEXT TRANSPORT PROTOCOL (HTTP) ENTITY TAG (ETAG).

5. The system of claim 2, wherein the attribute index is a hashing data structure.

6. The system of claim 2, wherein the attribute index is encrypted with a cryptographic algorithm.

7. The system of claim 2, wherein the object instance identifier is associated with a JAVASCRIPT OBJECT NOTATION (JSON) object.

8. The system of claim 2, wherein the object instance identifier is associated with a JAVA 2 ENTERPRISE EDITION (J2EE) object, wherein J2EE object is associated with a RENDERABLE class.

9. The system of claim 2, wherein at least one of the request broker and caching agent is a component of an IBM WEBSPHERE middleware.

10. The system of claim 2, wherein said caching engine is further configured to decompose the object instance request into a plurality of different attributes requests, wherein each of the different attribute requests is a request for at least one attribute values, wherein the cache engine stores the object cache for attribute values for each of the attribute requests retrieving an appropriate value from the object cache when available.

11. The system of claim 2, wherein the object instance identifier is associated with a JAVASCRIPT OBJECT NOTATION (JSON) object.

12. A computer program product for enhancing client-side object caching, the computer program product comprising a non-transitory computer readable storage medium having computer usable program code embodied therewith, the computer usable program code comprising: computer usable program code stored on a storage medium that when executed by a processor is operable to maintain an index within a cache of a client-side computing device, wherein the index stores objects and attributes associated with the objects obtained as a response, to requests of widgets, from a server; computer usable program code stored on a storage medium that when executed by a processor is operable to intercept an object requests from a widget wherein the object request comprises of an object identifier and an object type associated with an object instance, wherein the widget is an application executing on the client-side computing device, and wherein the object instance is a renderable entity of the widget; computer usable program code stored on a storage medium that when executed by a processor is operable to determine the at least one of objects and the attributes associated with the objects in the index, that can satisfy at least a portion of the object request; computer usable program code stored on a storage medium that when executed by a processor is operable to share the at least one of objects and the attributes associated with the objects, as at least in part response to the object request; computer usable program code stored on a storage medium that when executed by a processor is operable to, convey other portion of request to a server remotely located from the client-side object cache for other portions of the object request; computer usable program code stored on a storage medium that when executed by a processor is operable to receive a server-provided object attribute for the other portion of object request corresponding and computer usable program code stored on a storage medium that when executed by a processor is operable to, generate the object using attribute retrieved from the index and the server.

13. The computer program product of claim 12 further comprising:
   computer usable program code stored on a storage medium that when executed by a processor is operable to, convey the generated object to the widget.

14. The computer program product of claim 12, wherein the intercepting the object request, the querying of the client-side object cache, and generating the object are actions performed by the client-side computing device responsive to the object request from the client-side computing device.

15. The computer program product of claim 12 further comprising:
   computer usable program code stored on a storage medium that when executed by a processor is operable to decompose the object request into a plurality of different attribute requests, wherein each of the different attribute requests is a request for at least one attribute value;
   computer usable program code stored on a storage medium that when executed by a processor is operable to, for each of the different attribute requests, determine whether an appropriate attribute value for the corresponding attribute request is available from common data shared by other widgets; and
   computer usable program code stored on a storage medium that when executed by a processor is operable to, for each of the different attribute requests, when the attribute value available for the for the corresponding attribute request, obtain appropriate attribute value for the corresponding attribute request to the widget from a client-side object cache.

16. The computer program product of claim 15 further comprising:
   computer usable program code stored on a storage medium that when executed by a processor is operable to, before decomposing the object request into a plurality of different attribute requests, checking the object cache for an object that satisfies the object request;
   computer usable program code stored on a storage medium that when executed by a processor is operable to, when no object that satisfies the object request exists in the object cache, responsively preforming the decomposing of the object request, the querying of the attribute index and either the conveying of the appropriate attribute value or the conveying of the attribute request; and
   computer usable program code stored on a storage medium that when executed by a processor is operable to, when an object that satisfies the object request exists in the object cache, responsively providing the object that satisfies the object request from the object cache and not performing the decomposing of the object request, the querying of the attribute index, the conveying of the appropriate attribute value, or the conveying of the attribute request.

17. The computer program product of claim 12 further comprising:
   computer usable program code stored on a storage medium that when executed by a processor is operable to, convey a request for a Web page from the client-side computing device to the server, wherein the Web page comprises the object instance;
   computer usable program code stored on a storage medium that when executed by a processor is operable to, responsive to the request, receive markup from the server, said markup comprising a non-renderable section comprising object identifiers with corresponding object values for objects of the Web page and attribute identifiers and corresponding attribute values for attributes of the Web page;
   computer usable program code stored on a storage medium that when executed by a processor is operable to, responsive to receiving the markup, populate the object cache with the object identifiers and corresponding object values and attribute identifiers and corresponding attribute values; and
   computer usable program code stored on a storage medium that when executed by a processor is operable to, render the Web page on the client-side computing device, wherein the Web page as rendered includes the object instance, and wherein each of the attribute requests for the object instance is obtained from querying the object cache utilizing information obtained from the non-renderable section of the markup.

18. The computer program product of claim 12 further comprising:
   computer usable program code stored on a storage medium that when executed by a processor is operable to, convey a checksum request associated with the object request to an object service, wherein the object service is associated with a server-side resource;
   computer usable program code stored on a storage medium that when executed by a processor is operable to, receive an object checksum associated with the checksum request; and
   computer usable program code stored on a storage medium that when executed by a processor is operable to, compare the object checksum with a cached object checksum of the object cache, to determine whether cached content is current.

19. The computer program product of claim 12, wherein the decomposing the object request comprising:
   computer usable program code stored on a storage medium that when executed by a processor is operable to, determine an object type for an object associated with the object request;
   computer usable program code stored on a storage medium that when executed by a processor is operable to, select an object schema associated with the object request based on the object type; and
   computer usable program code stored on a storage medium that when executed by a processor is operable to, determine the plurality of different attribute requests using the selected object schema.

20. The computer program product of claim 12, wherein said client-side object cache is configured to decompose the object instance request into a plurality of different attributes requests, wherein each of the different attribute requests is a request for at least one attribute values, wherein the cache engine stores the object cache for attribute values for each of the attribute requests retrieving an appropriate value from the object cache when available.

\* \* \* \* \*